Dec. 7, 1965  A. W. HUGHES  3,221,788
EMULSIFIER
Filed Aug. 2, 1963  4 Sheets-Sheet 1
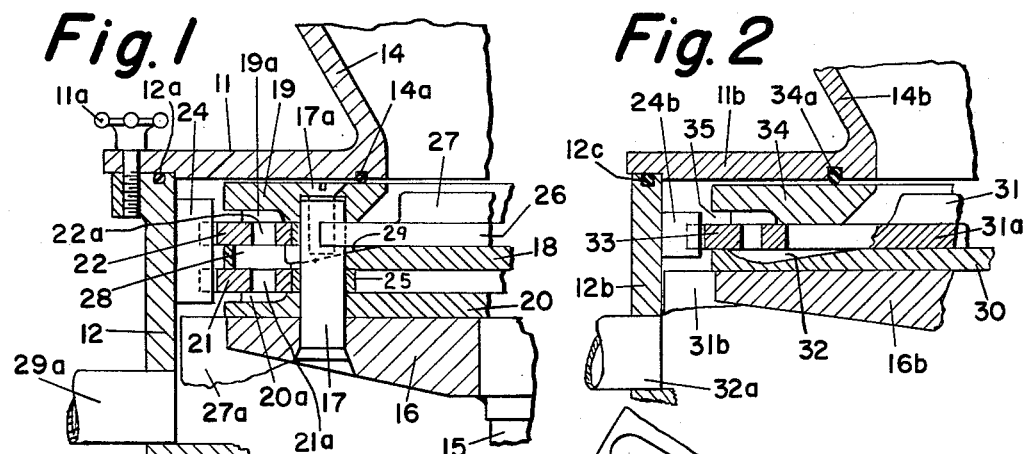
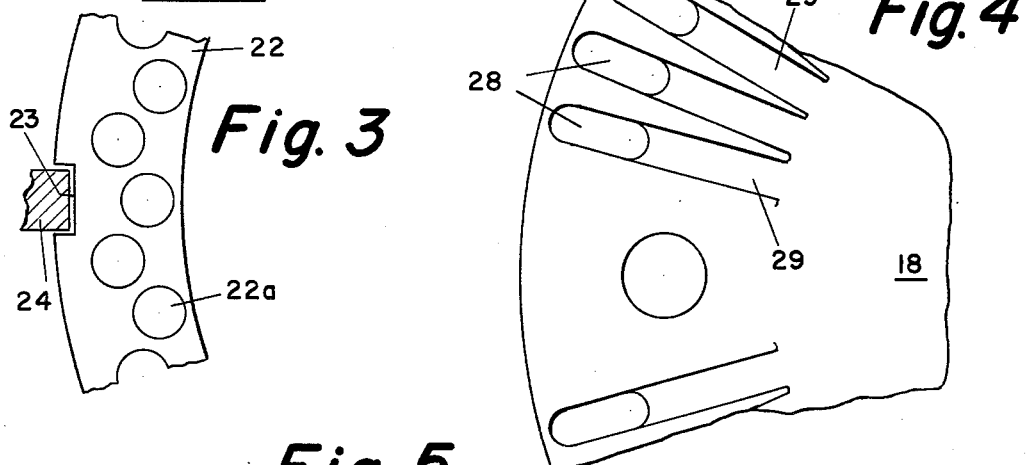
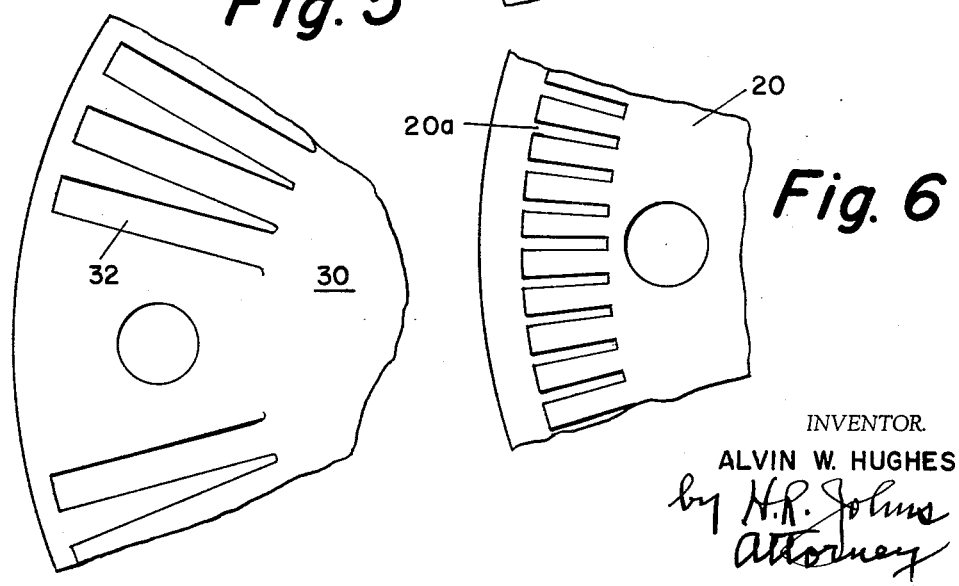
INVENTOR.
ALVIN W. HUGHES Dec. 7, 1965  A. W. HUGHES  3,221,788
EMULSIFIER
Filed Aug. 2, 1963  4 Sheets-Sheet 2

INVENTOR.
ALVIN W. HUGHES
by H.R. Johns
attorney

Dec. 7, 1965  A. W. HUGHES  3,221,788
EMULSIFIER

Filed Aug. 2, 1963  4 Sheets-Sheet 3

INVENTOR.
ALVIN W. HUGHES
by H. R. Johns
Attorney

INVENTOR.
ALVIN W. HUGHES

United States Patent Office 3,221,788
Patented Dec. 7, 1965

3,221,788
EMULSIFIER
Alvin W. Hughes, 4 N. 194 Church Road,
Bensenville, Ill.
Filed Aug. 2, 1963, Ser. No. 299,656
37 Claims. (Cl. 146—182)

This invention relates to an apparatus for emulsifying fresh sausage such as bologna, frankfurters, and weiners and has for an object to provide an emulsifier for this purpose which is simple, quick, capable of producing a fine emulsion of the type capable of better retaining fats in suspension and less likely to separate out. Another important advantage is the provision of an apparatus capable of the foregoing results with less heat input into the food product. Other new results and advantages have been enumerated in my prior application Serial No. 187,550 filed April 16, 1962, now patent 3,123,116 dated March 3, 1964 for Emulsifier of which the present application is a continuation-in-part. The herein disclosed invention is capable of producing still better results more efficiently, in shorter time, requiring less energy input with simpler apparatus than had been disclosed in the FIG. 1 of that parent application.

The two most important new advantages of this and the aforementioned application viewed together are (a) the absence of any scraping metal to metal contact between rotating and non-rotating cutting elements resulting in longer life, lessened heat input into sausage material being comminuted, and (b) the discovery of the difference between failure and success in terms of clearance spacing necessary to avoid jamming of the rotating cutting elements by tendinous strings and the overloading with stopping of a driving motor and the discovery of the best clearance spacing to obtain a satisfactory shearing of material from a usual chopper in which sausage components are mixed and cut in suspension. Tendinous strings are of various lengths and sizes, some as small as a hundredth of an inch in diameter and smaller, were found to be troublesome when the spacing between a non-rotatable ring or plate and the rotating cutting or shearing ring or plate on one or on each side of such non-rotating element was as small as .005 of an inch resulting in said overloading and stopping of the emulsifier due to such strings not being sheared but jammed in this small clearance space. It was found that a clearance space of .0015 to .0020 of an inch produced good shearing of strings and other edible material and produced good results. This does not mean that some sausage material may not be satisfactorily emulsified with larger clearance but to reduce risks and obtain sure results the spacing should be no larger between the flat rings than about .002 of an inch. It was found a clearance as small as .0005 of an inch or smaller became expensive to obtain flatness and to avoid some evidence of contacting.

The chief advantages in this present application over the parent application include the (1) inclined guideways wide enough to get more of the material to the sizing ring with less friction loss, (2) the elimination of strings collecting around the radial inner edge of plates 31, 33, and 35 in FIG. 1, of the prior application, (3) the use of 20, ¾ inch wide guideways which enabled a large quantity of sausage to be cut efficiently and without any strings collecting around the vertices or inner edges of the side walls of the guideways, (4) the making of the perforations in the non-rotatable ring large enough to avoid slowing the movement of the material, (5) quicker taking down the necessary parts for washing with their reassembly, and (6) the making of this apparatus and hopper low enough to have the hopper top edge get under the apron of a chopper while still having a motor directly connected without gearing or other transmission mechanism, thus avoiding previous filling and emptying a container from a chopper into this emulsifier hopper.

Referring to the drawings:

FIG. 1 shows an improved emulsifier partially in longitudinal section for handling a large quantity of material with no more than 3 rotatable rings or plates and 2 non-rotatable rings or plates.

FIG. 2 is a longitudinal section of another emulsifier having only 2 rotatable rings or plates and one non-rotatable ring or plate.

FIG. 3 is a plan view of one of the non-rotatable sizing rings for use in the FIG. 1 and FIG. 2 embodiments but on a larger scale.

FIG. 4 illustrates a top plan view of a portion of the feed ring in FIG. 1.

FIG. 5 exemplifies the feed ring of FIG. 2 in top plan view.

FIG. 6 shows a top plan view of the lower discharge ring in FIG. 1.

Figure 7:
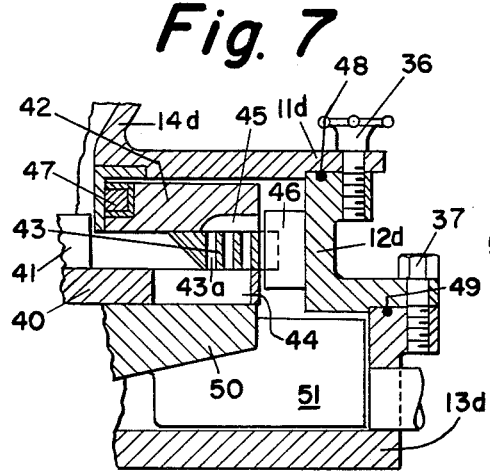

FIG. 7 is the emulsifier of FIG. 2 in the prior parent application mentioned.

Figure 8:
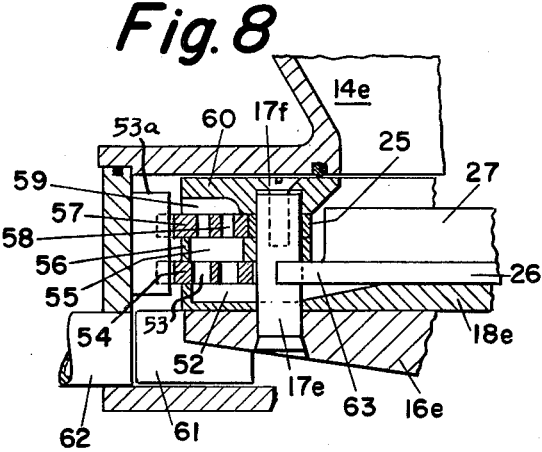

FIG. 8 illustrates a preferred embodiment for obtaining a finely comminuted sausage emulsion.

Figure 9:
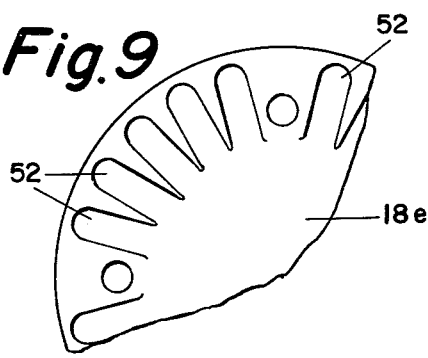

FIG. 9 is a top plan view of the feed ring used in FIG. 8.

Figure 10:
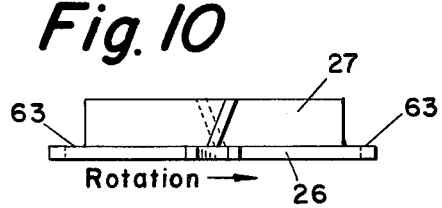

FIG. 10 is a side view of the cross-bar type spacer shown just above the feed ring in FIG. 8.

Figure 11:
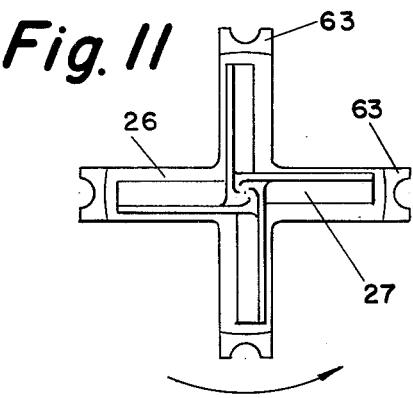

FIG. 11 is a top plan view of the lower spacer in FIG. 8 and in FIG. 10.

Figure 12:
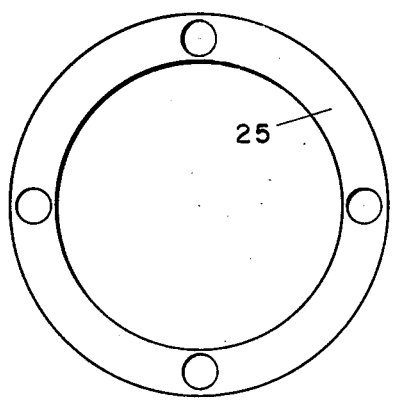

FIG. 12 is a top plan view of an upper or a ring type spacer in FIG. 8.

Figure 13:
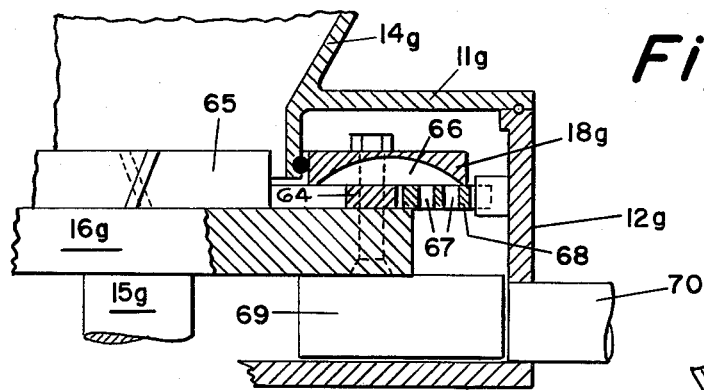

FIG. 13 is a partial section of a two ring construction for single stage shearing.

Figure 14:
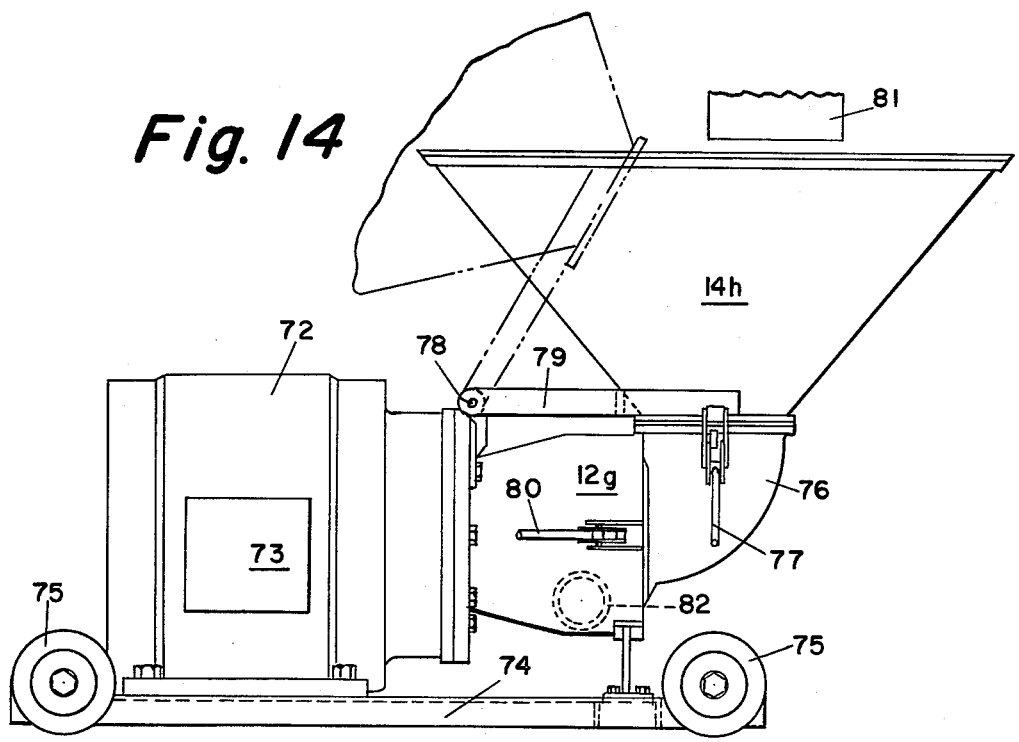

FIG. 14 shows a longitudinal side view of a preferred embodiment of FIG. 8 with the shaft horizontal for minimum height with direct drive.

Figure 15:
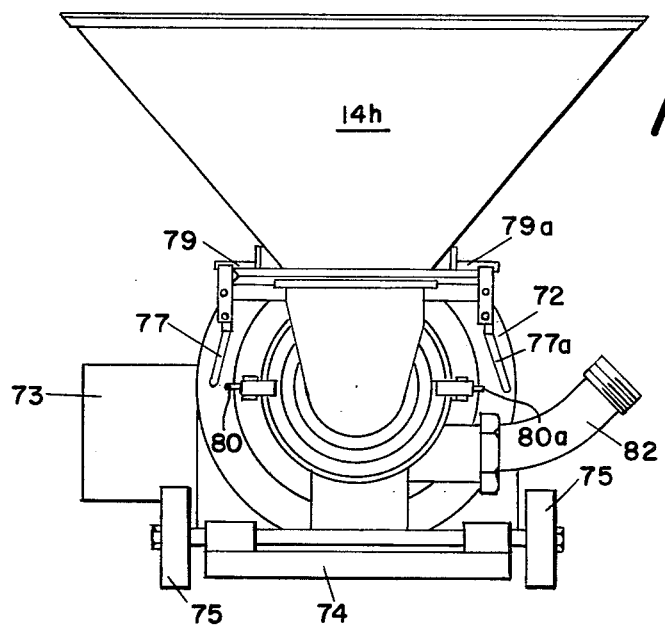

FIG. 15 is a right end view of FIG. 14.

Figure 16:
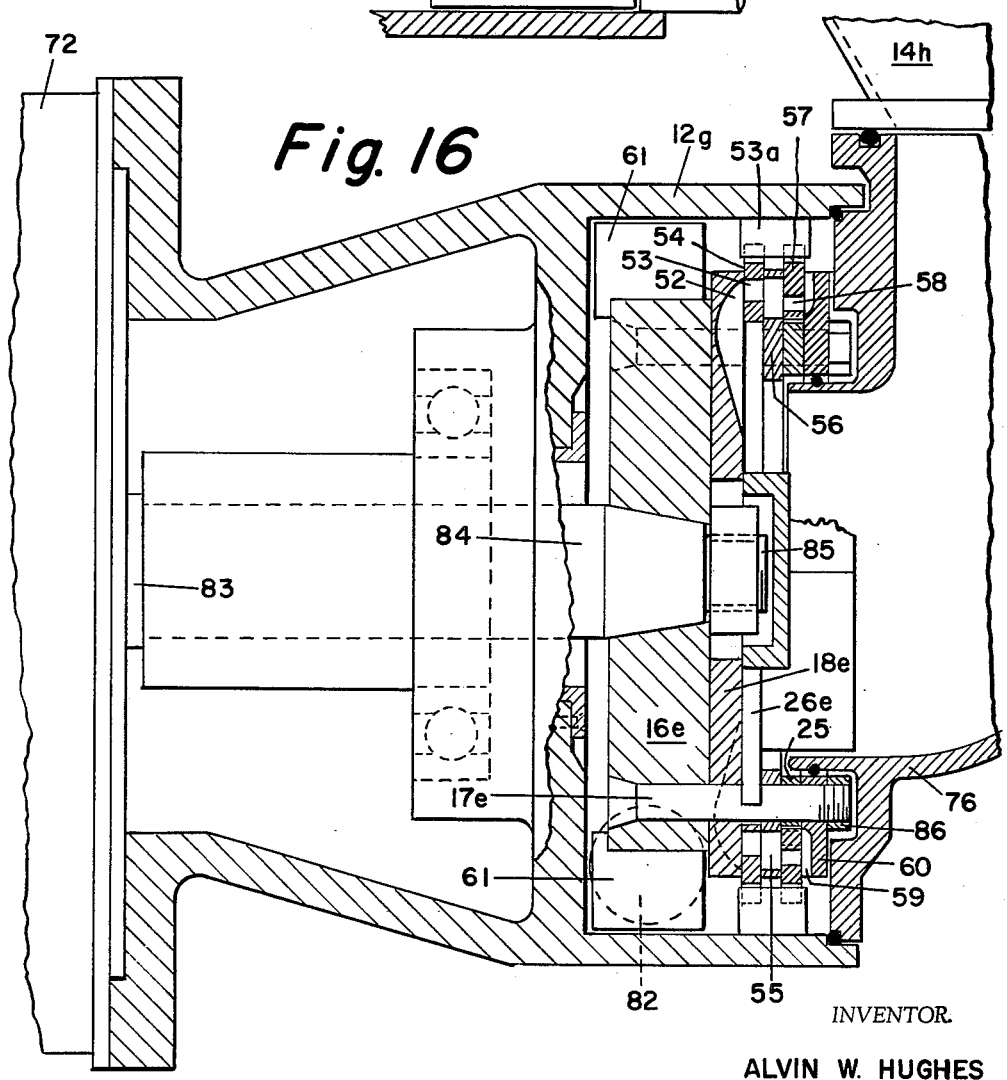

FIG. 16 is a partial longitudinal section through the emulsifier of FIG. 14.

In FIG. 1 the casing shown is in two parts, a cover 11 and side portions 12. A hopper 14 is integral with the casing cover 11 and a drive shaft 15 carries a head 16 to which are secured four angularly spaced posts 17. Discharge ring 20, ring spacer 25, sizing ring 21, feed ring 18, cross bar spacer 26, sizing ring 22, and discharge ring 19, are placed over posts 17 in that order. The rotatable rings are placed under clamping pressure by means of a headed screw 17a threaded into each post for clamping said rings against the head 16. Non-rotatable sizing rings 21 and 22 are similar and have at least two angularly spaced peripheral notches 23 engaging similarly spaced ribs 24 formed on or attached to the inner sides of casing portion 12. A rotatable cross-bar type spacer 26 shown in FIGS. 10 and 11 has its ends notched as shown to engage posts 17, is located above a ring type spacer shown in FIG. 12. These spacers are accurately made for holding rings 19 and 20 from ring 18, an amount equal to the thickness of each ring 21 and 22 plus .001 to .004 inch. This provides during operation a thin film of viscous sausage .0005 to .002 inch thick on each flat face of sizing rings 21 and 22 which otherwise might contact the ring next to it. When not operating, each sizing ring 21 and 22 rests on a rotatable member below it. Each sizing ring has a plurality of perforations 21a and 22a (FIGS. 1 and 3) and feed ring 18 in FIG. 1 has radially elongated perforations 28 through which the fed material divides for movement in opposite directions through the sizing ring perforations above and below it. On each arm of the spacer in FIGS. 10 and 11 is mounted an impeller vane 27 which has an inclination of about 22 degrees to a vertical plane through the axis of each bar and normal to its flat faces. The diameter of the casing sides 12 is about 9¼ inches and the preferred rate of rotation for the rings is about 1890 revolutions per minute.

In operation, the sausage material from a chopper after about 7 minutes mixing and cutting is emptied into the hopper 14. With the shaft 15 feed ring 18 and rings 19 and 20 operating at 1890 r.p.m., 340 pounds of sausage was processed in 36 seconds, using a 75 horsepower motor with the feed ring 7/16 of an inch thick having 36 recesses ½ inch wide by 1 5/16 inches long. Under the impetus of the impeller vanes 27 and centrifugal force the viscous liquid sausage was directed out and down the inclined guideways 29 to the perforations 28 which are peripherally closed with the result approximately half went downward through the perforations 21a in sizing ring 21 and half upward through perforations 22a in the sizing ring 22. After passing these sizing rings the material entered discharge recesses 19a in ring 19 and the recesses 20a in discharge ring 20. Each of these discharge recesses is open at its radial outer or peripheral end for the discharge of the comminuted material inside the casing but outside the rings where it fell under gravity for movement out of the casing through a discharge pipe 29a but under the force of a discharge impeller 27a. Instead of a discharge impeller fluid pressure may be used, and on the input side fluid pressure may be applied to the incoming material in place of or in addition to the input impeller 27. The shearing operation is performed in two stages each of a feed ring. The first stage shearings is performed by the edges of the feed ring perforations passing across the edges of the sizing ring perforations adjacent such feed ring. Second stage shearings occur on an opposite side of each sizing ring when the edges of each of the discharge recesses pass across it. It is thought that movement of the sausage liquid into each sizing ring as well as out of each sizing ring and out of the discharge rings is due to a combination of both centrifugal pressure and pressure due to the input impeller. The thickness of the cross bars 26 as well as the height of the impeller vanes 27 function to impart energy to the viscous liquid. In FIG. 1 the ring spacer 25 is used below the feed ring as it reduces leakage of sausage into the space below the central portion of said feed ring. The cross-bar type spacer is used between the feed ring and the upper discharge ring 19 inasmuch as the wide angular distance between the cross-bars is needed to insure movement of material down and out the guideways 29 in the feed ring 18 and into the sizing rings. In one view the apparatus of FIG. 1 may be likened to two emulsifiers of the FIG. 2 type in parallel with the feed ring common to each. The capacity of this FIG. 1 may be increased by it being provided with 20 guideways each ¾ of an inch wide and about 1 13/16 of an inch long. The feed ring, each sizing ring and discharge ring have edges of its recesses or perforations that must perform the shearing or cutting a huge number of times. For this reason these rings are each made of a material to possess a hardness of about Rockwell C60. The head 16 which has to be drilled for shaft 15 and posts 17 as well as attachment of the output impeller blades 27a needs no such comparable hardness. Hand screws 11a enable the shearing and cutting elements to be taken out, washed, and replaced quickly. Packing 14a prevents any incoming material from passing around the shearing elements without being reduced in size. Packing 12a precludes leakage out of the casing. The output impeller forces the emulsified material out the discharge pipe 29a.

In FIG. 2, a hopper 14b or supply pipe supplies the viscous sausage liquid toward the functionally imperforate central portion of feed ring 30 having thereon a cross bar type spacer 31a on which is mounted an input impeller 31 of the type used in FIG. 1. Instead of perforations in the radial outer portions of the feed ring, this feed ring 30 is provided with inclined guideways 32 leading the input material to a first shearing stage between edges of the supply ring recesses, which may be considered to be the outer portions of guideways, and the edges of perforations (FIG. 3) in a sizing ring 33. The second shearing stage occurs between edges of recesses 35 in the discharge ring 34 passing over the edges of the perforations in the non-rotatable sizing ring, which ring is held against rotation by a rib 24b as in FIG. 1 on the casing side portion 12b. The packing 12c and 34a engaging casing cover portion 11b are for the same purpose as in FIG. 1. After discharge from recesses 35 in discharge ring 34, the cut material falls within the casing to be engaged by the output impeller 31b for movement out of the discharge pipe 32a. The head 16b as in FIG. 1 is not hardened as are the discharge ring 34, sizing ring 33, and feed ring 30. The sizing ring is of the type shown in FIG. 3 and the discharge ring is of the type shown in FIG. 6 looking up from the inner or under side. A top plan view of the feed ring of FIG. 2 is shown in FIG. 5 inasmuch as the outer recesses have their bottom portions closed. A 60 horsepower motor emulsified the same size batch of sausage material from a chopper after the same time in the chopper in 40 seconds, only a few seconds more. Here again greater quantity of material could be emulsified in a shorter time with the ¾ inch wide guideways.

In FIG. 7 is the early construction disclosed in FIG. 2 of the parent application Serial No. 187,550 filed April 16, 1962 and now Patent 3,123,116 dated March 3, 1964 for Emulsifier. The casing cover 11d, side portion 12d, and bottom 13d are clamped by hand screws 36, and bolts 37 to be readily taken out for removal and cleaning of the feed ring 40 to which is clamped in spaced relation the discharge ring 42 by the posts and spacers not shown but referred to elsewhere. An input impeller 41 directs the incoming material radially outward from a hopper 14d or supply pipe. The sizing ring 43 is non-rotatable and provided with the plurality of perforations 43a through which material from the feed ring perforations or recesses 44 is directed into the discharge recess 45 of discharge ring 42 where it is discharged into the casing, and falls to be moved out of a discharge pipe by the output impeller vanes 51 secured to the head 50. The rib 46 on the inside of the casing is engaged by notches in the sizing ring to prevent rotation. Packing 47 prevents movement of the material around the shearing stages each side of the sizing ring. Packings 48 and 49 avoid leakage of material out of the casing. The clearance spacing each side of the sizing ring is the same as mentioned for the embodiments disclosed in FIGS. 1 and 2, namely between about .0005 of an inch and .002 inch. This embodiment has been shown to be suitable for emulsifying sausage from a grinder having fairly uniform size particles but not always suitable for the output of a chopper because in chopper outputs there are non-uniform sizes of particles and the larger may stick in the supply passageway over the feed ring 40 at its outer end. Another reason why this FIG. 7 construction is not a preferred embodiment is its frictional resistance to movement of the viscous liquid due to there being a nearly 90 degree change in direction of the material travel downward into the feed ring that does not occur in other embodiments such as that in FIGS. 1 and 2. Also there is higher friction in the material passing through 288 small perforations only ⅛ of an inch in diameter in the sizing ring. This embodiment can be brought more nearly up to date by the use of a feed ring like that shown in FIG. 9 with ¾ inch wide guideways, and the sizing ring of the type shown in FIG. 2 with large perforations, as well as an input impeller of the type shown in FIGS. 10 and 11.

FIG. 8 shows a preferred construction of the type also shown in FIG. 16. The hopper 14e or supply pipe feeds material to the feed ring 18e having twenty inclined guideways 52 of ¾ inch width with the bottom of the guideways being closed (FIGS. 5 and 8) to direct the sausage through the perforations 53 in non-rotatable sizing ring 54 spaced from the rotatable elements to have the thin film of viscous liquid on each side thereof of the dimensions mentioned previously for FIGS. 1 and 2 constructions. From sizing ring 54 the viscous liquid enters transfer ring 56 and passes through its perforations 55 into a second sizing ring 57 having smaller perforations 58 than those in the first sizing ring 54. The material is discharged through radially elongated, peripherally open recesses 59 in discharge ring 60 after which the output impeller vanes 61 move the emulsified material out of a discharge pipe 62. The first sizing ring 54 has 60 perforations $13/32$ of an inch in diameter while the second sizing ring 57 has 120 perforations each $9/32$ of an inch in diameter. The transfer ring 56 has 90 perforations $1/8$ of an inch wide by half an inch long and substantially equally angularly spaced. An advantage is the slowing of the material discharged with the result it is more finely sheared. Another advantage is the reduction in chopping time possible for material to be emulsified. This finer emulsion is due to longer time for the material to be worked in this apparatus. The 60 perforations in the first sizing ring are arranged in two rows angularly spaced 6 degrees between centers, one row having a radius of $4 1/8$ inches and the other row $4 3/8$ inches radius. In each embodiment the feed ring, the sizing, transfer ring, and discharge ring have a Rockwell C hardness of about 60 and must be ground flat and then lapped to obtain a close approach to being perfectly flat on its faces having recesses or perforations whose edges assist in shearing of the material. The sizing rings are usually each about $5/16$ of an inch thick, the upper discharge ring is about $15/32$ of an inch thick to accommodate the packing rings. In FIG. 8 a cross bar spacer is used contiguous to the feed ring in order to allow angular space between the bars 26 for the supply of incoming material to the guideway recesses 52. Above the transfer ring 56, a ring type spacer 25 is used to separate the transfer ring from the discharge ring 60 the desired amount, since there is no need to feed material radially through this spacer.

It has been empirically determined that an input impeller having its four vanes sloping as indicated in FIG. 10 with respect to the direction of rotation of about 22 degrees provides the desired component of axially inward movement for the incoming material moving away from the supply pipe from the hopper. Without this inclination the impeller vanes are not as effective in giving a best output for the emulsifier. In FIG. 11 the spacing portions 63 at the ends of the cross bars must be of the desired thickness for accurately spacing the rotatable elements between which placed. The leading faces of the inclined vanes 27 in FIGS. 10 and 11 may be either flat or slightly concave.

In FIG. 13 the casing portions 11g and 12g are connected to the hopper 14g. Should the hopper need to be tilted it is pivoted adjacent to a top and side portion where convenient. The single stage shearing in this embodiment enables less friction to occur between the viscous liquid and the emulsifier elements than is the case in any other embodiment. Here the fine particle sizes will result when the rotatable elements have a higher speed than has been mentioned for any prior mentioned construction. The drive shaft 15g is connected to a head 16g and the spacer 64 is preferably the ring type of FIG. 12, as illustrated in FIG. 13. Material from the hopper is deflected radially outward by the input impeller 65. Some of such material may impinge the imperforate head 16g and other parts of such incoming material may not reach the head but be thrown radially outward by the impeller 65, pass through the inclined guideways 66 and reach the perforations 67 in the sizing ring 68. The feed element is a ring 18g to provide a space for the incoming material. Shearing of the particles of sausage in the viscous liquid occurs only in one stage between the edges of the many recesses or inclined guideways 66 as they pass across close to the edges of the perforations 67 in the non-rotatable sizing ring 68. Here again the sizing ring is of the floating type, i.e., capable of limited axial movement between the head 16g and the feed ring 18g when not operating. During operation the sizing ring floats between the head and feed ring between thin films of the viscous liquid between about .0005 and .002 of an inch thick on each of its flat faces. After being sheared the material is discharged from the lower face of the sizing ring inside the casing sides 12g, but radially outside the head 16g, falls downward to be engaged by the output impeller blades 69 and pushed out of the casing through the discharge pipe 70. A speed of not less than about 1750 revolutions per minute, and preferably higher, is used. The holes in the sizing ring may be of any size desired but are preferably correlated to the speed of the feed ring, the smaller the sizing ring perforations, the smaller will be the output per unit of time unless the rotational speed of shaft 15g and its driven parts be higher.

FIGS. 14 to 16 inclusive illustrate a construction embodying a feed ring and four recessed rings of FIG. 8 arranged with the drive shaft horizontal and the rings upstanding for use in handling sausage from a usual chopper. The hopper 14h supplies chopped sausage material to a casing 12g containing the emulsifying apparatus for most economically finely dividing or emulsifying meat particles with least heat input into the material. An electric motor 72 drives the emulsifier and is mounted on a low underslung platform or frame 74 carried by wheels 75. Electrical connections enter a junction box 73. Below the hopper an elbow 76 or supply pipe leads the material from the hopper into the emulsifier casing. A pair of opposite quick detachable toggle or other type clamps 77 and 77a provides a quick detachable and tight connection between the hopper and supply pipe. Another pair of similar quick detachable clamps 80 and 80a enables the casing to be opened for removal, disassembly of the rings, and impeller for cleaning, and their reassembly and reinsertion in the casing. For swinging the hopper with or without the elbow 76 to an out of the way position to get at the casing contents, a pivot 78 to which the hopper is connected by rods 79 is arranged as shown so that the hopper may be swung to the dotted line position. A suitable wedge, catch or support may be provided for holding the hopper in this dotted line position. In the full line filling position indicated the top of the hopper is no more than 35 inches above the floor and adapted to be placed under an apron 81 of a chopper whereby the hopper may be filled directly from a chopper without the necessity for any intermediate bucket or other handling container being used. After emulsifying, the sausage is forced out of the casing through the discharge pipe 82.

The motor shaft 83 (FIG. 16) is provided with an extension 84 on which the head 16e, feeding 18e, and other rings are mounted, the outer end 85 of shaft extension 84 being threaded as shown. The same numbering of some of the parts described in connection with FIG. 8 is repeated here inasmuch as the invention in FIGS. 8 and 16 is the same. The motor shaft extension 84 has a taper to facilitate removal of parts for cleaning. The head 16e carries the four spaced posts 17e on which are mounted the rotatable feeding 18e, the spaced transfer ring 56, the sizing rings 54 and 57, and the spaced discharge ring 60. Unlike the FIG. 8 construction the sizing rings do not rest on a ring below when not operating because gravity is of less importance when the drive shaft is horizontal instead of vertical. A cross bar spacer 26e maintains the transfer ring accurately spaced from the feed ring 18e. A ring spacer 25 of FIG. 12 spaces the discharge ring 60 from the transfer ring 56. Sizing ring 54 is shiftable axially between rings 56 and 18e. Sizing ring 57 is similarly shiftable between discharge ring 60 and transfer ring 56 to be floating on thin films of the viscous sausage liquid during operation. The finely comminuted particles of meat are discharged through the discharge recesses 59 through the 360 degree of travel of this discharge ring 60 and are moved by fluid pressure to the left in FIG. 16 where an output impeller 61 directs the material out of the casing through discharge pipe 82 to where desired. A nut engages the threaded portion 85 of the shaft extension and presses the head 16e tightly on the tapered part of the shaft extension 84. This nut may extend through the cross bar spacer, through the hub of the input impeller and out far enough to be accessible for removing it from the portion 85 or a large enough hole may be left in the impeller hub and spacer to allow a socket wrench to be inserted for removal of this nut in order that the head and rings clamped thereon may be removed as a unit. This latter expedient is preferred because neither the threaded extension, the nut, nor the socket wrench needs to be of large diameter. When this nut is not accessible, the nuts on the several clamping posts must be removed to take the rings off to gain access to said nut. A socket wrench hole will fill up with material but need not allow any of the shearing elements to be by-passed. In any of these embodiments described the head and feed ring may be structurally perforate axially but yet function satisfactorily as though imperforate. Therefore in each embodiment illustrated, the head and feed ring may be properly characterized as being functionally imperforate to preclude any substantial by-passing of material around the cutting or shearing elements.

The nine ring construction of FIG. 1 of the parent patent provided more emulsifying capacity than is needed in the usual commercial batches of sausage output from a usual chopper. The constructions of FIGS. 1, 2, 8 and 14 to 16 herein are more efficient and require less power. The viscous sausage liquid requires about 12½ horsepower per shearing stage in which it is believed the major part is consumed by friction and only a minor part in the actual shearing or cutting. However, when a large bulk is to be handled, that in FIG. 1 of the prior application may be brought up to date by sizing rings with the holes of a larger diameter (of $13/32$ of an inch and 60 of them, see FIG. 3 herein). Said FIG. 1 construction needs a longer and better shaped input impeller of at least 2 inches or 2½ inches or more, and also the ¾ inch wide inclined guideways for the feed rings 31, 33, and 35. This FIG. 1 of the earlier application, though having the important small clearance spaces between the rotatable and non-rotatable rings, nevertheless allowed the tendinous strings to collect around the radial inner edges of the feed rings 31, 33 and 35. In the present application the feed rings being functionally imperforate in their central portions have no radially inner edges on which such strings may collect. The entire reasons why the ½ inch wide inclined guideways of the present disclosure, FIG. 1 for example, were not as satisfactory in eliminating the collection of tendinous strings around the inner vertices of the inclined guideway side walls, are not understood, even though the possibility of large pieces getting jammed be eliminated.

In the embodiment of FIGS. 14 to 16 as well as FIG. 8 and the other and lower numbered figures of the drawing, where the parts are used, the following dimensions have been found preferable. The feed ring or plate is 9½ inches in diameter, ½ inch thick, guideways 20 in number, each ¾ of an inch wide with an inner end approximately 2⅞ inches from the axis and with the base of each guideway curved with a 1¼ inch radius of curvature and no less than a $1/16$ inch thickness at the base, four equally angularly spaced holes for the clamping posts, such holes drilled $21/32$ of an inch in diameter; where the shaft threaded end projects through a 1½ inch radius hole has been left. The spacing each side of a sizing ring has been previously mentioned. Each sizing ring or plate has a 5 inch outside radius and a $41/16$ inch inside radius with at least two opposite notches each about $17/32$ of an inch wide by $7/32$ of an inch radial depth to engage a rib secured on the inside of the casing to prevent rotation. The sizing ring or plate adjacent to the feed ring or plate has 58 holes made with $13/32$ of an inch drill 6 degrees between centers in staggered rows, the outer row being on a $417/32$ inch radius to the center and the inner row on a $45/16$ inch radius. With 6 degrees between centers there should be 60 holes but two in the outer row have been omitted where the notches occur, one that would otherwise occur at each notch. The sizing ring or plate between the transfer and discharge rings or plates has twice the number of holes in the same radius for each hole and the spacing 3 degrees between centers and each hole made with a $9/32$ inch drill. Two holes in the outer row are omitted adjacent each notch making a total of 116 holes. The transfer ring or plate has a 9½ inch outside diameter, a 6 inch inside diameter, a thickness of $312/320$ inch with 80 milled slots 4½ degrees between centers, ¼ inch wide and $21/32$ of an inch long with rounded ends spaced at least $1/32$ of an inch inward of the outer rim. The ring type spacer between the transfer and discharge rings or plates has an outer radius of $315/16$ inches, an inner radius of 3⅛ of an inch, a thickness of the sizing ring plus exactly .002 of an inch more than that of the sizing ring it spans, and 4 drill holes $21/32$ of an inch on a diameter of 7 inches between centers. The discharge ring or plate has an outer diameter of 9½ inches, an inner diameter of 7 inches, a thickness of ⅜ of an inch, 120 slots with their radial outer ends open ⅛ of an inch wide by $12/16$ of an inch long and $3/16$ of an inch deep.

What is claimed is:

1. In an emulsifier for viscous fluid sausage, said emulsifier having a casing, a supply pipe leading into said casing, a rotatable shaft within said casing, at least a pair of rotatable members mounted on said shaft and spaced apart axially, the member of said pair which is the more remote from said supply pipe having a functionally imperforate central portion to stop any generally axial movement of material from said supply pipe, a non-rotatable ring having perforations extending directly between its opposite flat faces, said perforations being spaced from the inner and outer edges thereof, the other rotatable member of said pair being located between said supply pipe and said aforementioned remote and first mentioned rotatable member, said non-rotatable ring and said second mentioned rotatable member of said pair being substantially coaxial and provided with a hollow central portion into which material from said supply pipe is discharged, means whereby said material may be moved generally radially outward from adjacent said functionally imperforate central portion of said first mentioned rotatable member to the perforations in said non-rotatable ring member, said means including radially elongated recesses in at least one of said rotatable members, said material brought to the perforations in said non-rotable ring being sheared and cut by edges of said elongated recesses in a rotatable member passing across edges of said perforations in said non-rotatable ring, a discharge pipe for cut material from said casing after being passed through said non-rotatable ring and discharged radially outside a rotatable member but within said casing, the combination therewith of the improvement to enhance shearing of said material and to eliminate jamming of tendinous strings within clearance space between said non-rotatable ring member and a rotatable member, said improvement including the cooperating faces of said rotatable and non-rotatable ring members being flat, and spacing means between said rotatable members holding them apart by an amount equal to the thickness of said non-rotatable ring plus an amount substantially less than .010 of an inch, whereby during operation each face of the non-rotatable ring is axially spaced from an adjacent face of a rotatable member by substantially less than .005 of an inch to insure effective shearing of tendinous strings.

2. A combination according to claim 1 in which the spacing between each face of the non-rotatable member and a rotatable member during operation is between about .0005 and .002 of an inch.

3. A combination according to claim 2 in which said non-rotatable ring is axially shiftable and during operation said non-rotatable ring is spaced from each adjacent rotatable member by a thin film of said viscous fluid sausage.

4. A combination according to claim 3 in which said means whereby said material may be moved radially outward includes an impeller secured on said functionally imperforate central portion of said remote rotatable member of said pair and radial guideways leading to perforations in said nonrotatable ring.

5. A combination according to claim 4 in which said impeller is provided with at least 4 vanes each of which is mounted on a cross bar portion.

6. A combination according to claim 5 in which the outer end of each cross bar portion is notched and engages a clamping post, the outer end of each crossbar spaces the rotatable members the desired distance apart, and a nut on each clamping post presses a rotatable member against one of said cross bar outer end portions.

7. A combination according to claim 4 in which at least an outer end portion of each impeller vane is arranged at an angle to impart an axial component of motion away from said supply pipe as well as radially outward.

8. A combination according to claim 4 in which said rotatable members have a diameter of not more than about one foot, a speed of at least about 1750 revolutions per minute, and about 60 perforations each about 13/32 of an inch in diameter in said non-rotatable ring.

9. A method of shearing particles of precut viscous fluid sausage material to form more finely comminuted particles without metal to metal scraping contact and with little heat input into the material, said method comprising directing the material between perforated rings for shearing said material particles in suspension when said rings are spaced less than the width of teninous strings in the material and more than about .0005 of an inch and substantially less than .005 of an inch apart under the angular velocity of at least about 1750 revolutions per minute relative movement between the shear rings, and under a substantial linear velocity of the material through said rings.

10. Apparatus for finely dividing particles in a viscous liquid with single stage shearing and a small frictional resistance in said apparatus, which comprises a casing, a supply pipe for material leading into said casing, a rotatable shaft in said casing, a pair of spaced rotatable members on said shaft, a non-rotatable perforate sizing ring substantially coaxial with said rotatable members, the rotatable member more remote from said supply pipe's entry into said casing having a functionally imperforate central portion to stop the free generally axial movement of material through said casing beyond said rotatable member, the rotatable member between said first mentioned rotatable member and said supply pipe being a feed ring provided with generally radial guideways through which material may be moved radially outward to adjacent perforations in said sizing ring, means for imparting momentum to the material to force it through said guideways and through the perforations in said sizing ring for discharge within said casing but radially outside said functionally imperforate rotatable member, pressure means for moving the discharged material outside said casing and through a discharge pipe, the shearing taking place on movement of the edges of said guideways in the feed ring over the edges of the perforations in said sizing ring, the spacing between the sizing ring and feed ring being substantially less than .005 of an inch and of the order between about .0005 to .0040 of an inch, the spacing between the sizing ring and first mentioned rotatable member being not more than that between the sizing and feed ring, said sizing ring being slightly axially shiftable between said rotatable members but during operation a thin film of material being formed on each face of said sizing ring, and a rotatable spacing member to hold said sizing ring out of metal to metal scraping contact with a rotatable member and reducing heat input to the material.

11. Apparatus for shearing particles in a viscous liquid with at least two stage shearing which comprises a casing, a supply pipe leading into said casing, a rotatable shaft in said casing, at least a pair of spaced rotatable rings on said shaft, and each provided with elongated recesses in which material is moved radially outward, one member of said pair being a feed ring having a functionally imperforate central portion with radially inclined guideways closed at their outer ends, the other member of said pair being a discharge ring having hollow central portion coaxial with said feed ring and having said elongated radial recesses open at their outer ends but closed at their inner ends, spacing and clamping means between and for said feed and discharge rings, a non-rotatable sizing ring coaxial with said feed and discharge rings located between them having perforations between and spaced from its inner and outer edges, means for moving said viscous liquid radially outward of said feed ring to and through the perforations in said sizing ring and to and through the recesses in said discharge ring where the discharge of the material is radially out the periphery of said discharge ring recesses but within said casing, a discharge pipe from said casing, and means for moving the cut material out of said casing and through the said discharge pipe, said sizing ring being shiftable slightly axially of said shaft and spaced from said discharge ring and from the feed plate during operation by a thin film of viscous liquid substantially less than .005 of an inch thick and about .0005 to .0020 inch in thickness during operation of the machine whereby there is no metal to metal contact between said non-rotatable sizing ring and said rotatable feed ring as well as said rotatable discharge ring during operation, said shearing being effected as the edges of the feed recesses pass across the edges of the perforations on one face of the sizing ring as the viscous liquid enters one face of the sizing ring and the edges of the discharge ring recesses move across the edges of the sizing ring perforations on the face of the sizing ring adjacent said discharge ring.

12. Apparatus according to claim 11 in which handling capacity of said combination has been increased by a cross-sectional area of the feed guideways when there are no more than about 5 per quadrant, and there is a discharging of the viscous liquid in opposite axial directions from said feed ring through a perforate non-rotatable sizing ring adjacent each face of said feed ring, thence from each sizing ring through an adjacent discharge ring and radially outward from each discharge ring within said casing.

13. A combination according to claim 11 which comprises said spacing and clamping means including posts which are angularly spaced extending from one of said rotatable rings through a discharge ring radially inwardly from said sizing ring, the spacing means being of the cross bar type having an outer end portion of each bar notched to engage a post, a surface of at least one bar adjacent said supply pipe being provided with an impeller vane to engage material entering said casing through said supply pipe and throw said viscous liquid material radially outward with force enough to push said material generally radially outward in said guideways, through perforations in said sizing ring, and outward in said discharge ring, said vane and bar on which mounted each assisting in directing the material radially outward, said vane having an inclination of the order of about 22 degrees to a plane which is normal to the plane of said ring and through the axis of said rings in the direction of rotation of said feed ring to provide an axially inward component of movement away from said supply pipe for material thrown out by an impeller vane.

14. A combination according to claim 12 in which said spacing means on the side of said feed ring away from said supply pipe is of the ring type in which each post passes through said ring between its inner and outer edges and clamping pressure on said spacing ring is to reduce any radial inward movement of material past said spacing ring.

15. Apparatus for four stage shearing of particles in a viscous liquid accompanied by a slowing movement of material and said shearing being in successive stages upon the same material, said apparatus including a casing, a rotatable shaft in said casing, a supply pipe leading into said casing, a feed ring on said shaft provided with a functionally imperforate central portion from which inclined guideways lead material radially outward, an impeller on said feed ring, a transfer ring coaxial with, and spaced from said feed ring toward said supply pipe, a discharge ring also spaced from said transfer ring on an opposite side from said feed ring, spacing and clamping means for said rings all three of which are rotatable, a non-rotatable sizing ring between said feed ring and transfer ring and a second sizing ring also between said transfer ring and discharge ring, each sizing ring having perforations between its inner and outer edges and passing directly between opposite flat faces, the outer ends of feed ring and transfer ring recesses being closed while the outer ends of recesses in said discharge ring are open for discharge of material within said casing, the spacing between each sizing ring and its adjacent rings being less than .005 of an inch and more than about .0005 of an inch whereby each sizing ring may be slightly shiftable axially and a thin film of material is formed during operation on each side of each sizing ring to preclude metal to metal contact with inevitable objectionable heating of the viscous liquid, and means for moving material out of said casing after being moved through said discharge ring.

16. A combination according to claim 15 in which the sizing ring between said discharge and transfer rings has smaller perforations than the first sizing ring whereby the movement of material through said rings is slowed.

17. In an emulsifier comprising a casing, a supply pipe leading to said casing, a rotatable shaft within said casing, at least a feed ring on said shaft on which an impeller throws the incoming material radially outward, said feed ring having a functionally imperforate central portion to stop general axial movement of material from going beyond said feed ring and provided with elongated radial recesses in outer portions of said feed ring, said recesses being peripherally closed, at least one discharge ring secured to said feed ring in spaced relation for rotation therewith and having radially elongated recesses open at their outer ends for discharge of material therefrom but within said casing, a sizing ring non-rotatable between said feed ring and discharge ring and having a plurality of perforations intermediate the inner and outer edges of said sizing ring, said perforations extending directly between its opposite flat faces, said sizing ring being spaced from said discharge ring and feed ring during operation by thin films of a viscous liquid, each such film having an axial depth of between about .0005 and .002 of an inch and said sizing ring being slightly shiftable axially between said plate and discharge ring, a discharge ring, a discharge pipe from said casing, and means moving the cut material from said casing and out said discharge pipe, the particles of solid material being sheared on each side of said sizing ring by edges of recesses in the feed ring on one side and edges of the recesses in the discharge ring on an opposite side passing across but close to the edges of perforations in said sizing ring, the combination therewith of the improvement for reducing friction of material moving adjacent said feed ring and the sharpness of turns in a stream of material prior to entering said sizing plate perforations, said improvement including inclined radial guideways formed on the side of said feed ring toward said supply pipe and leading into said sizing ring, the side walls of said guideways reducing any tendency of the fed material to slip and not rotate with said feed ring and also reducing any tendency for strings to collect at the inner vertices formed by side walls of said radial guideways.

18. In a sausage emulsifier of the type having a casing, a supply pipe leading into said casing, a feed ring having a diameter of the order of less than a foot and provided with generally radial guideways having side walls for directing material radially outward, a rotatable shaft in said casing and to which said feed ring is secured, at least one discharge ring rotatable with said feed ring and shaft and spaced from said feed ring, said discharge ring having peripherally open recesses, at least one sizing ring between said feed ring and discharge ring having perforations, said feed ring having recesses whose edges pass across sizing ring perforations shearing solid particles in a viscous liquid, a functionally imperforate central portion in said feed ring coaxial with said sizing and discharge rings, and, an input impeller adapted to change the direction of generally axial movement of material from said supply pipe to a radially outward direction, said sizing ring being spaced from metal to metal contact with said feed ring and discharge ring but close enough to effect shearing of particles of meat in said liquid, said space being less than .005 of an inch and more than about .0005 of an inch, said sizing ring being shiftable axially and during operation said space being filled with a film of the material being emulsified, the combination therewith of the improvement to reduce the danger of friction of the viscous liquid against the guideway walls becoming excessive in radial outward movement of the material, and to reduce the danger of tendious strings collecting at the vertices of side walls when inclined guideways are used, said improvement including such guideways being at least about ¾ of an inch wide and arranged with no more than a total of about 20 such guideways, spacing means between said feed ring and discharge ring, and means clamping said feed ring and discharge ring against said spacing means, said guideways being approximately equally spaced between clamping means.

19. In an emulsifier for sausage and other materials, a casing, a drive shaft therein, a feed ring fixed to said shaft for rotation therewith, a non-rotatable sizing ring having perforations therein across which said feed ring rotates, the feed ring having radial slots therein closed at their periphery, means for moving a viscous liquid radially outward in said feed slots into and through perforations in said sizing ring, the spacing between said feed ring and sizing ring being sufficient to maintain them out of rubbing heat generating contact whereby there is little if any heat input into said liquid yet close enough for the edges of radial slots in said feed ring and the edges of perforations in said sizing ring to cooperate in effecting shearing of particles in said liquid as the slots in said feed ring pass across the edges of sizing ring perforations, and a rotatable discharge ring having radial slots open at their radially outer ends the combination therewith of the improvement to assist in keeping said sizing ring and feed ring and discharge ring out of contact during the rotation of the feed and discharge rings, and spacing means for maintaining said rings out of contact during operation of said emulsifier when said sizing ring is axially shiftable within limits said improvement including the separation of said sizing ring and feed ring and discharge ring being small enough not to permit substantial loss of liquid radially out from between them but large enough for a thin cushioning film of liquid being emulsified to form between them during operation.

20. An emulsifier comprising a casing, a supply pipe for material to be emulsified leading into one end of said casing, a drive shaft in said casing, at least a pair of rotatable rings coaxial with and secured to said shaft, the ring of said pair which is remote from said input pipe having a functionally imperforate central portion, a non-rotatable ring between said rotatable rings, means between said casing and non-rotatable ring to lock the same against rotation, clamping posts passing through said rotatable rings and radially outside said supply pipe but radially inside of said non-rotatable ring, spacing means cooperating with said posts for holding said rotatable rings far enough apart not to scrape said non-rotatable ring during operation, said non-rotatable ring locking means being constructed to permit limited axial movement of said ring and the floating thereof during operation between thin films of the material being emulsified, one of said rotatable rings having guideways directed and sloping radially outward to guide the fed material to said non-rotatable ring under enhanced centrifugal force on the material, said non-rotatable ring having perforations therein extending between its opposite faces whereby due to the small spacing between the feed ring containing said guideways the edges of said guideways passing across the edges of said perforations effect a breaking up of particles of the material to be emulsified, the peripheral ends of said guideways being closed, the supplied material moving generally axially from said supply pipe to said functionally imperforate central portion of a ring, then radially outward through said guideways, through said perforations in the non-rotatable ring with the breaking up of the materials to be emulsified by the edges of said guideways and edges of said perforations and the eventual discharge of material outside at least one of the rings but inside said casing with longitudinal movement within said casing, and a discharge pipe through which the emulsified material is moved from said casing.

21. An emulsifier according to claim 20 in which the rotatable ring having a functionally imperforate central portion carries an input impeller having vanes tilted to not only force the incoming material radially outward but also to a substantial extent axially away from said supply pipe.

22. An emulsifier comprising a casing, a drive shaft in said casing, at least a pair of rotatable recessed rings carried by said shaft, a non-rotatable perforate ring between the rings of said pair and spaced from each ring of said pair between about .0005 to .002 of an inch, one end of said casing having an opening for the input of material to be emulsified, a passageway leading into said casing opening, the rotatable ring of said pair remote from said opening having a central portion which is functionally imperforate to the passage of material axially therethrough, the other rotatable ring of said pair and said non-rotatable ring both having an input axial opening for receiving material from said hopper passageway, the rotatable rings each having elongated generally radial recesses therein, said remote rotatable ring with functionally imperforate central portion receiving feed of material and centrifugally directing material through its elongated recesses with the radially outer ends of said recesses being closed transversely of said recesses for directing material through the perforations of said non-rotatable ring, the elongated recesses in the other rotatable ring of said pair having radially outer ends of its recesses open for the centrifugal discharge of material from the perforations of said non-rotatable ring, said perforations in this non-rotatable ring being directly through said ring between its opposite faces radially spaced from inner and outer edges thereof, and located to have the edges of said perforations passed over by the edges of recesses in said rotatable rings to effect cutting of material by said edges, said rings being spaced from said casing to receive material discharged from said rotatable ring having the peripherally open recesses, and a discharge passageway leading from said casing outside said rings.

23. An emulsifier according to claim 22 in which said non-rotatable ring is movable longitudinally of said shaft when not in operation but during operation is held out of contact with each rotatable ring of said pair by a layer of material being emulsified, at least one such layer being supplied by material from said rotatable feed plate having the functionally imperforate central portion and at least some of another such layer being supplied by material from the perforations in the non-rotatable ring, and spacing means between said rotatable rings.

24. An emulsifier according to claim 22 in which an input impeller is mounted on said shaft contiguous to the functionally imperforate central portion of said remote rotatable ring and an output impeller is provided to direct material from said discharge ring into said discharge passageway, said rotatable plates having a speed of about 1750 revolutions per minute when the outside diameter of said rings is substantially less than about one foot, said input impeller being of an axial length of at least the axial thickness of two rings.

25. In an emulsifier of the type in which alternate rotatable and non-rotatable recessed rings cut up material to be emulsified by engagement with edge portions of ring recesses, and including a casing, a supply passageway for material, and a drive shaft for said rotatable rings, the combination therewith of the improvement for finely cutting said material, said improvement including said rings being each spaced from an adjacent ring between about .0005 to .002 of an inch during operation, at least some of the rings having an axial opening into which material from said supply passageway discharges, a rotatable ring remote from said supply passageway having a central portion which is functionally imperforate to the supplied material, an impeller on said imperforate axial portion, at least one rotatable ring being constructed to direct the radially outwardly supplied material in opposite directions axially through perforate non-rotatable sizing rings for discharge through rotatable discharge rings having recesses open at their radially outer ends, said casing being spaced from said rings to provide a discharge space for material, and an outlet passageway for material from said discharge space, the edges of perforations in said non-rotatable rings cooperating with the edges of recesses in said rotatable rings to effect the cutting of said material, each non-rotatable sizing ring floating during operation between thin layers of material being provided with a spacer to keep it out of contact with an adjacent rotatable ring on each side of it.

26. An emulsifier comprising a hopper into which sausage to be comminuted is supplied, a casing supporting said hopper, a drive shaft within said casing, at least a pair of spaced rotatable recessed rings driven by said shaft, a non-rotatable perforate ring between rotatable rings of said pair, an impeller on said shaft within some of said rings and within said casing for moving material radially outward, said rotatable rings extending radially inwardly more than said non-rotatable ring whereby material thrown out by said impeller is subjected to centrifugal force from at least one of said rotatable rings, said non-rotatable ring being shaped to direct material into the recesses of at least one rotatable ring, each rotatable ring being provided with radially elongated recesses therein whereby material is centrifugally fed radially outward; the radially outer ends of said elongated recesses in at least one of said rotatable rings being blocked against egress of material to force the fed material through perforations in said non-rotatable ring when the edges of the perforations in the non-rotatable ring and edges of the elongated recesses in the rotatable rings engage the fed material to cut such material into finer pieces, at least one of said rotatable rings being provided with said elongated recesses open at their outer ends for discharge of the material radially outward under centrifugal force, a discharge impeller to engage material discharged by said last mentioned rotatable ring, and a discharge pipe for material forced out by said discharge impeller, the rotating rings being each spaced axially from said non-rotatable ring at least about .0005 of an inch and not more than a few thousandths of an inch during operation.

27. An emulsifier comprising a casing, a supply passageway, said casing being open on one axial end for supply of material from said passageway to the inside of the casing, a drive shaft in said casing, at least three rings within said casing including a pair of rotatable recessed rings driven by said shaft, a non-rotatable perforate ring between the rings of said pair, at least the rotatable ring of said pair which is remote from the input end of said casing being mounted on said shaft and provided with a central portion which is functionally imperforate to the passage of material therethrough, the other two rings of said three being provided with a central perforate portion into which material is supplied from said passageway, the intermediate ring of said three having perforations intermediate its inner and outer edges and being spaced between about .0005 and .002 inch from each adjacent rotatable ring during operation, means for feeding material from said centrally functionally imperforate ring radially outward, through the perforations of said intermediate ring and discharged through recesses radially open at the periphery of the rotatable ring which is adjacent the input passageway, but between the casing and the outer edges of said rings, and a passageway from said casing for the emulsified material, the solid material in that supplied being cut by the edges of the recesses in said rotatable rings passing across the edges of the perforations in said non-rotatable intermediate ring, said intermediate ring being spaced from the rotatable rings by the material being emulsified, and the rotation speed being of the order of at least about 1750 revolutions per minute when the diameter of rings is well under about 12 inches.

28. An apparatus for shearing particles of solid matter in suspension in a viscous liquid material to form more finely comminuted particles without metal to metal scraping contact and with little heat input into the material, said apparatus comprising at least one pair of perforate shearing rings spaced more than about .0005 of an inch and substantially less than .0050 of an inch apart, means for moving one of said shearing rings with an angular velocity of at least about 1750 revolutions per minute, and means for centrifugally directing the material between said shearing rings under a substantial linear velocity.

29. An emulsifier including at least a pair of spaced rotatable rings having a non-rotatable perforate ring between the rings of said pair and spaced from each ring of said pair, means for rotating said pair of rings at a speed of at least about 1750 revolutions per minute, at least one of the rings of said pair being provided with generally radial recesses, means for forcing viscous liquid radially outward in said radial recesses of a rotatable ring to and through the perforate portions of said non-rotatable ring, a casing enclosing said rings, a supply pipe leading material to be emulsified to said casing, a discharge pipe from said casing, and means for forcing comminuted material from said casing into and through said discharge pipe, the comminuting being accomplished by the edges of recesses in a rotatable ring passing across the edges of the perforations in said non-rotatable ring when close to but not in contact with either rotatable ring of said pair, said non-rotatable ring being longitudinally shiftable axially of the rotatable rings when not operating but during operation said non-rotatable ring is axially cushioned o na thin layer of material between each face of the perforate non-rotatable ring and the adjacent face of a rotatable ring of said pair, the spacing of said rings being small enough and the friction of the viscous liquid being large enough to preclude any substantial quantity of material by-passing said shearing action of the recess edges.

30. In an emulsifier for shearing particles of material which emulsifier includes at least one non-rotatable perforate ring between at least two recessed and rotatable rings, with a rotatable spacer thicker than said non-rotatable ring clamped to said rotatable rings whereby during operation said rotatable rings are held out of substantial heating and scraping contact with said non-rotatable perforate ring, the combination therewith of the improvement for faciliating movement of material through perforations and recesses in said rings when said rings are mounted on a driven shaft within a casing, said improvement including a major number of said rings being provided with an axial space radially within them such that a radial cross-section of such space is of an area constituting a substantial portion of an area of any one of said major number of rings, and impeller blades mounted on said shaft and having an axial length exceeding that of said major number of rings provided with said axial space.

31. An emulsifier according to claim 30 in which at least some of said impeller blades have portions which are tilted in a direction of rotation to direct some of the incoming material to be emulsified, inwardly away from an entrance for material into said casing.

32. An emulsifier according to claim 31 in which said tilted portions of said impeller blades are adjacent an entrance for material to said casing and a portion of each such impeller blade has a portion which is not so tilted but is substantially parallel to an axis of said shaft to direct material radially outward for being sheared by edges of the perforations and recesses in said rings.

33. Apparatus for emulsifying a viscous liquid comprising at least a pair of rotatable rings each having radially elongated recesses therein, one of said rings being for the feed of material for the emulsifying of the material and having its recesses closed at a peripheral edge of said ring, the other ring of said pair being a discharge ring and having its recesses open at its periphery, a non-rotatable sizing ring between said rotatable pair of rings but out of contact during operation with either of said rotatable rings yet closely spaced from each during operation, said sizing ring having a plurality of circumferential rows of perforations, the edges of said perforations on one face of said sizing ring cooperating with the edges of recesses in one rotatable ring to effect a cutting of particles in said liquid and the edges of the same perforation on an opposite face of said sizing ring similarly spaced for cooperation with edge of the recesses in another ring of said pair, a feed passageway leading to the radial recesses in said feed ring having its recesses peripherally closed, a discharge passageway radially outside said discharge ring, the spacing between said sizing ring and said rotatable rings being small enough and the friction between the rotating viscous liquid and said sizing ring on each face thereof being small enough to avoid any substantial flow of viscous liquid radially outward from between said rings.

34. Apparatus according to claim 33 in which said non-rotatable sizing ring is axially shiftable within small limits during operation to provide a thin cushioning film of liquid on each face thereof.

35. An emulsifying apparatus including at least one rotatable ring having a functionally imperforate central portion, at least one non-rotatable sizing ring spaced from said rotatable ring but generally coaxial therewith, a casing enclosing said rings, a driven shaft on which said rotatable ring is mounted, a supply passageway for leading a viscous liquid material into said casing and toward said central functionally imperforate portion of said first mentioned ring, an impeller on a central portion of said rotatable ring and radially within a hollow central portion of said sizing ring, said impeller being shaped to direct the supplied material both axially toward the central imperforate portion of said rotatable ring and generally radially outward under centrifugal force as said shaft rotates, said sizing ring having perforations between opposite generally flat faces, said apparatus including diverging radial recesses having side walls for directing material toward and through the perforate portions of said sizing ring, the adjacent faces of the rotatable and non-rotatable rings being spaced apart more than about .0005 of an inch and less tha about 0.005 of an inch whereby on rotation of said shaft the side walls of said recesses are passed across the sizing ring perforations to effect a shearing action upon particles of solid material carried by the viscous liquid, an outlet passageway for the emulsified material, and means whereby the material after being cut may be directed through said outlet passageway.

36. In an emulsifier for sausage and other high viscosity liquids, comprising at least a pair of adjacent recessed plates one a feed plate movable with respect to the other and said other being a sizing plate, a casing surrounding said plates, the recesses in said feed plate being supplied with the material to be emulsified and the said sizing plate having the walls of its recesses arranged substantially at 90 degrees to the faces of said plates to receive material moved through recesses in the first mentioned plate and to discharge the material into said casing, means for effecting said relative movement between said plates and for moving the material through the recesses of said plates, the combination therewith of the improvement to reduce heat input to said plates and material by maintaining said plate surfaces out of direct sliding contact with each other and at the same time insure that any tendinous strings and the like do not get jammed in between said plates, said improvement including means for spacing said plates during operation an amount substantially less than about .005 of an inch apart but more than .0005 of an inch, an dsaid plate moving means being capable of effecting a high enough velocity of relative movement for the edges of the recesses in said adjacent plates to be capable of cutting solid and liquid particles in the material as the edges of the recesses in one plate move across the edges of the recesses in the other plate.

37. An emulsifier for sausage and other highly viscosity liquids comprising at least a feed ring, means for rotating said ring whereby the liquid material may be moved to radial outer portions of said ring, a non-rotatable sizing ring provided with recesses through which the material is moved under pressure from said feed ring into said sizing ring, and a discharge ring beneath said feed and sizing rings for receiving material therefrom, said discharge ring having generally radial recesses open at its periphery and through which material is discharged in a generally radial outward direction, a casing enclosing said rings but spaced radially from said rotatable rings and extending below said discharge ring, said non-rotatable ring being spaced axially from said rotatable rings during operation substantially less than .005 of an inch but more than about .0005 of an inch.

References Cited by the Examiner

UNITED STATES PATENTS

| | | | |
|---|---|---|---|
| 676,461 | 6/1901 | Geisel | 146—187 X |
| 756,713 | 4/1904 | Sander | 146—187 |
| 2,645,982 | 7/1953 | Cowles | 241—257 |
| 2,734,728 | 2/1956 | Meyers | 146—192 X |
| 2,811,997 | 11/1957 | Schmidt et al. | 146—241 |
| 2,953,179 | 9/1960 | Friess | 146—192 |
| 2,977,056 | 3/1961 | Gustke | 146—192 X |
| 3,053,297 | 9/1962 | Brundler | 146—192 |
| 3,076,487 | 2/1963 | Illsley | 146—182 |
| 3,116,772 | 1/1964 | Lamb et al. | 146—241 |
| 3,123,116 | 3/1964 | Hughes | 146—192 |

OTHER REFERENCES

Bertele, German application No. 1,039,876, printed September 1958, 1 page spec., 1 sheet drawing.

ROBERT C. RIORDON, *Primary Examiner.*

J. SPENCER OVERHOLSER, *Examiner.*